US007268288B2

(12) United States Patent
Yamane et al.

(10) Patent No.: US 7,268,288 B2
(45) Date of Patent: Sep. 11, 2007

(54) MUSIC SELECTION APPARATUS AND MUSIC DELIVERY SYSTEM

(75) Inventors: Hiroaki Yamane, Kadoma (JP); Junichi Tagawa, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 587 days.

(21) Appl. No.: 10/868,013

(22) Filed: Jun. 16, 2004

(65) Prior Publication Data

US 2004/0255761 A1 Dec. 23, 2004

(30) Foreign Application Priority Data

Jun. 17, 2003 (JP) ............... 2003-171923

(51) Int. Cl.
*G10H 1/00* (2006.01)
*G10H 1/18* (2006.01)
*G06F 7/00* (2006.01)
*G06F 17/30* (2006.01)

(52) U.S. Cl. ............................ 84/615; 707/3
(58) Field of Classification Search ............... 700/94; 84/609, 615, 634; 707/3
See application file for complete search history.

(56) References Cited

U.S. PATENT DOCUMENTS

| 5,918,223 | A | 6/1999 | Blum et al. | |
| 7,053,290 | B2 * | 5/2006 | Tagawa et al. | 84/609 |
| 2002/0087565 | A1 | 7/2002 | Hoekman et al. | |
| 2002/0130898 | A1 * | 9/2002 | Ogawa et al. | 345/727 |
| 2003/0045954 | A1 * | 3/2003 | Weare et al. | 700/94 |

FOREIGN PATENT DOCUMENTS

JP 2001-273747 10/2001

OTHER PUBLICATIONS

Mingchun Liu et al., "Weight Updating for Relevance Feedback in Audio Retrieval", 2003 IEEE International Conference on Acoustics, Speech, and Signal Processing Proceedings, (ICASSP), Hong Kong, Apr. 6-10, 2003, IEEE International Conference on Acoustics, Speech and Signal Processing (ICASSP), New York, NY, IEEE, US, vol. 1 of 6, Apr. 6, 2003, pp. V644-V647, XP010639354.
Stan Z Li, "Content-Based Audio Classification and Retrieval Using the Nearest Feature Line Method," IEEE Transactions on Speech and Audio Processing, vol. 8, No. 5, Sep. 2000, pp. 619-625, XP011054046.
G. Tzanetakis et al., "Musical Genre Classification of Audio Signals," IEEE Transactions on Speech and Audio Processing, IEEE Inc., New York, US, vol. 10, No. 5, Jul. 2002, pp. 293-302, XP002307404.
E. Wold et al., "Content-Based Classification, Search, and Retrieval of Audio," IEEE Multimedia, IEEE Computer Society, US, vol. 3, No. 3, 1996, pp. 27-36 XP002154735.

* cited by examiner

*Primary Examiner*—Jeffrey Donels
(74) *Attorney, Agent, or Firm*—Wenderoth, Lind & Ponack, L.L.P.

(57) ABSTRACT

A music selection apparatus includes a music data storage unit, an impression amount storage unit, a music selection priority level storage unit, and a music selection processing unit. The impression amount storage unit stores an impression amount obtained by quantifying a listener's impression of a piece of music, for each piece of music stored in the music data storage unit. The music selection priority level storage unit stores a music selection priority level indicating at least one of a reproduction history and a preference level of a piece of music, for each piece of music. The music selection processing unit performs a music selection process of selecting a piece of music to be reproduced from the pieces of music, using a distance between the pieces of music in an impression space and the music selection priority level, the impression space having coordinate axes composed of components of the impression amount.

20 Claims, 17 Drawing Sheets

| MUSIC NUMBER | MUSIC DATA | RELATED INFORMATION | IMPRESSION AMOUNT | | MUSIC SELECTION PRIORITY LEVEL | | | |
|---|---|---|---|---|---|---|---|---|
| | | | X COORDINATE VALUE | Y COORDINATE VALUE | NUMBER OF REPRODUCTIONS | LAST REPRODUCTION DATE | PREFERENCE SCORE | AREA PREFERENCE LEVEL |
| 1 | SS1.wav | ×× | 0.13 | −0.54 | 3 | 2003.05.02 | 7 | 2.2 |
| 2 | SS2.mp3 | ○○ | −1.17 | 0.87 | 0 | (blank) | 5 | 0 |
| ⋮ | ⋮ | ⋮ | ⋮ | ⋮ | ⋮ | ⋮ | ⋮ | ⋮ |

FIG. 2

| MUSIC NUMBER | MUSIC DATA | RELATED INFORMATION | IMPRESSION AMOUNT | | MUSIC SELECTION PRIORITY LEVEL | | | PREFERENCE SCORE |
|---|---|---|---|---|---|---|---|---|
| | | | X COORDINATE VALUE | Y COORDINATE VALUE | NUMBER OF REPRODUCTIONS | LAST REPRODUCTION DATE | | |
| 1 | SS1.wav | ×× | 0.13 | −0.54 | 3 | 2003.05.02 | | 7 |
| 2 | SS2.mp3 | ○○ | −1.17 | 0.87 | 0 | (blank) | | 5 |
| ... | ... | ... | ... | ... | ... | ... | | ... |

F I G. 3
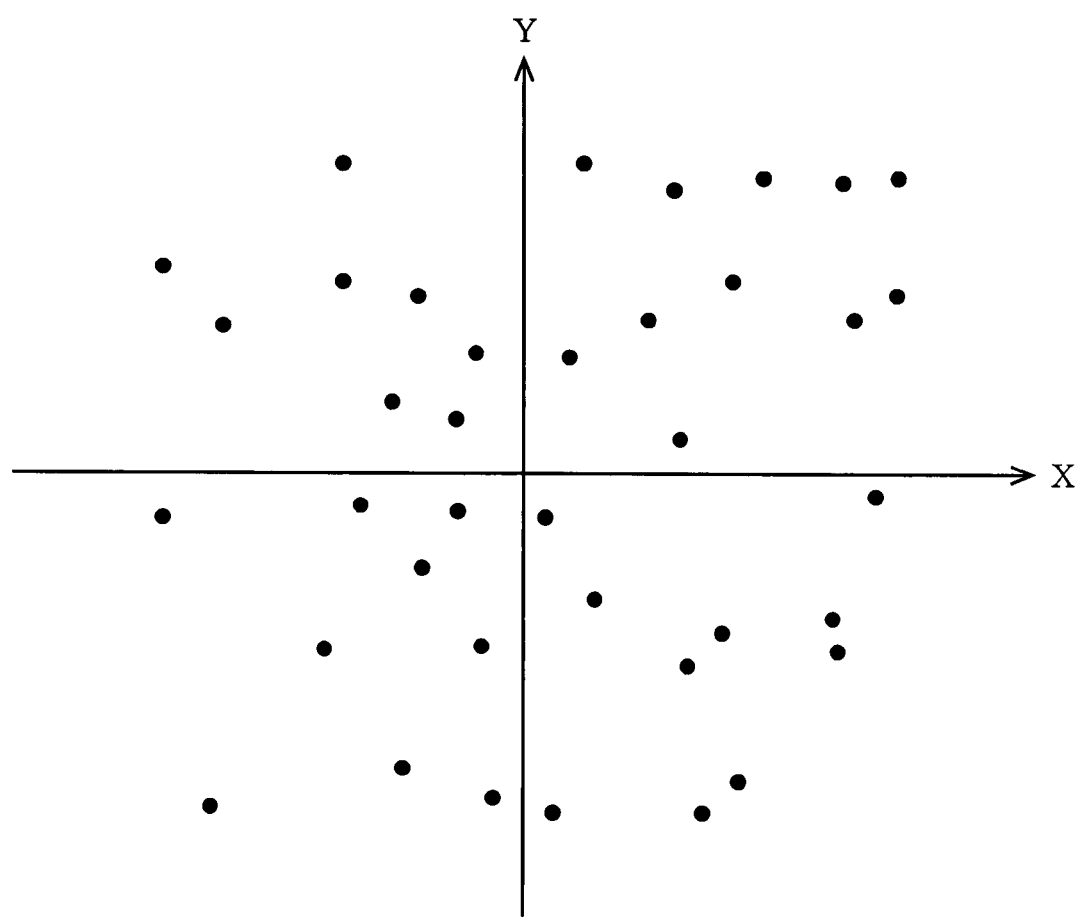

F I G. 8

| MUSIC SELECTION NUMBER | MUSIC TITLE | PLAYING TIME |
|---|---|---|
| 1 | ○○ | 4′ 2 4 |
| 2 | × × | 3′ 1 5 |
| ⋮ | ⋮ | ⋮ |

F I G. 1 1
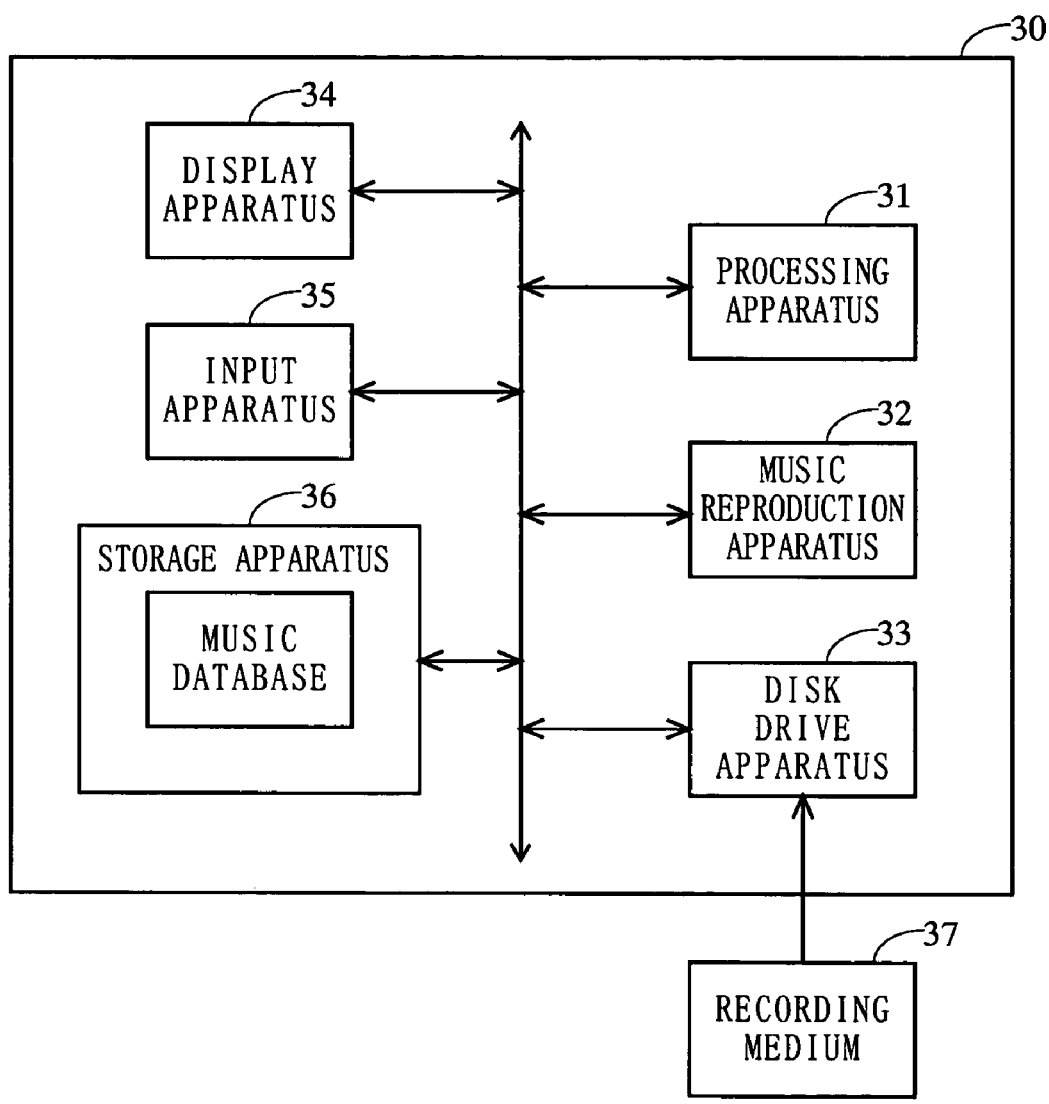

FIG. 12

| MUSIC NUMBER | MUSIC DATA | RELATED INFORMATION | IMPRESSION AMOUNT | | MUSIC SELECTION PRIORITY LEVEL | | | |
|---|---|---|---|---|---|---|---|---|
| | | | X COORDINATE VALUE | Y COORDINATE VALUE | NUMBER OF REPRODUCTIONS | REPRODUCTION DATE | | PREFERENCE SCORE |
| 1 | SS1.wav | ×× | 0.13 | −0.54 | 3 | 2003.05.02 2003.05.13 2003.08.05 | | 7 |
| 2 | SS2.mp3 | ○○ | −1.17 | 0.87 | 0 | 2003.07.09 2003.07.13 | | 5 |
| ... | ... | ... | ... | ... | ... | ... | | ... |

FIG. 13

| MUSIC NUMBER | MUSIC DATA | RELATED INFORMATION | IMPRESSION AMOUNT | | MUSIC SELECTION PRIORITY LEVEL | | | | ADDITIONAL INFORMATION |
|---|---|---|---|---|---|---|---|---|---|
| | | | X COORDINATE VALUE | Y COORDINATE VALUE | NUMBER OF REPRODUCTIONS | LAST REPRODUCTION DATE | PREFERENCE SCORE | | |
| 1 | SS1.wav | ×× | 0.13 | −0.54 | 3 | 2003.05.02 | 7 | | SPRING |
| 2 | SS2.mp3 | ○○ | −1.17 | 0.87 | 0 | (blank) | 5 | | SUMMER |
| ... | ... | ... | ... | ... | ... | ... | ... | | ... |

F I G. 14

| MUSIC NUMBER | MUSIC DATA | RELATED INFORMATION | IMPRESSION AMOUNT | | MUSIC SELECTION PRIORITY LEVEL | | | | |
|---|---|---|---|---|---|---|---|---|---|
| | | | X COORDINATE VALUE | Y COORDINATE VALUE | NUMBER OF REPRODUCTIONS | LAST REPRODUCTION DATE | PREFERENCE SCORE | AREA PREFERENCE LEVEL | |
| 1 | SS1.wav | ×× | 0.13 | −0.54 | 3 | 2003.05.02 | 7 | 2.2 | |
| 2 | SS2.mp3 | ○○ | −1.17 | 0.87 | 0 | (blank) | 5 | 0 | |
| ... | ... | ... | ... | ... | ... | ... | ... | ... | |

MUSIC SELECTION APPARATUS AND MUSIC DELIVERY SYSTEM

BACKGROUND OF THE INVENTION

1. Field of the Invention

The present invention relates to a music selection apparatus for selecting music based on a user's reproduction history or a user's preference level, a music delivery system, methods thereof, a program, and a recording medium.

2. Description of the Background Art

Some of conventional audio players record the reproduction time and the number of reproductions of pieces of music the user has heard, select any piece of music in order of the reproduction time and the number of reproductions, and reproduce the pieces of music. By this, pieces of music that match the user's preferences, i.e., pieces of music with a great reproduction time and a great number of reproductions, are automatically selected on a priority basis, and thus the user can hear pieces of music that match their preferences, without the need to perform the operation of skipping the user's less-preferred music.

The aforementioned audio player selects music the user is often hearing. Therefore, with a music selection method of this audio player, there is a high possibility that the music selection results are almost the same every time. That is, selected music may have a small range of variation and thus the music selection results may become monotonous. If the music selection results become monotonous, the user turns out to hear the same music every time; as a result, the user may get tired of hearing the selected music.

SUMMARY OF THE INVENTION

Therefore, an object of the present invention is to provide a music selection apparatus capable of selecting pieces of music that match the user's preferences and providing a wide variety of music selection results.

The present invention has the following features to attain the object mentioned above. A first aspect of the present invention is directed to a music selection apparatus for selecting a piece of music to be reproduced and providing the piece of music to a user. The music selection apparatus comprises a music data storage unit operable to store data on pieces of music; an impression amount storage unit operable to store an impression amount for each piece of music whose data is stored in the music data storage unit, the impression amount being obtained by quantifying a listener's impression of a piece of music; a music selection priority level storage unit operable to store a music selection priority level for each piece of music, the music selection priority level indicating at least one of a reproduction history and a preference level of a piece of music; and a music selection processing unit operable to perform a music selection process of selecting a piece of music to be reproduced from the pieces of music, using a distance between the pieces of music in an impression space and the music selection priority level, the impression space having coordinate axes composed of components of the impression amount.

In a second aspect, the music selection processing unit may include: a region determination unit operable to determine one region from among regions into which the impression space is divided, based on the music selection priority level of each piece of music; and a music selection performing unit operable to perform a music selection process on pieces of music whose impression amounts belong to the region determined by the region determination unit, using the music selection priority level.

In a third aspect, the music selection processing unit may include: an association level calculation unit operable to calculate an association level for each piece of music, the association level of a piece of music being obtained by changing the music selection priority levels of other pieces of music based on a positional relationship with the other pieces of music in the impression space; and a music selection unit operable to select a piece of music to be reproduced with probability based on the music selection priority level and the association level of each piece of music.

In a fourth aspect, the music selection processing unit may include: a music selection priority level calculation unit operable to calculate the music selection priority level of all positions in the impression space, based on the music selection priority level of each piece of music; a reference position determining unit operable to determine a reference position in the impression space with probability based on the music selection priority level calculated by the music selection priority level calculation unit; and a music selection determination unit operable to determine a piece of music to be reproduced based on a positional relationship between a position of each piece of music and the reference position in the impression space.

In a fifth aspect, the music selection apparatus may further comprise a reproduction unit operable to reproduce the piece of music selected by the music selection processing unit, using the data stored in the music data storage unit.

In a sixth aspect, the music selection priority level may include at least one of a number of reproductions of a piece of music and a date on which a piece of music was last reproduced, as information indicating the reproduction history. In this configuration, the music selection apparatus further comprises: a music specification receiving unit operable to receive from the user an input specifying a piece of music to be reproduced; and a reproduction history update unit operable to update, when the input is received by the music specification receiving unit, the reproduction history stored in the music selection priority level storage unit, in response to the input.

In a seventh aspect, the music selection preference level may include at least information indicating a preference level. In this configuration, the music selection apparatus further comprises: a preference level setting receiving unit operable to receive from the user an input for setting a preference level for the piece of music reproduced by the reproduction unit; and a preference level update unit operable to update, when the input is received by the preference level setting receiving unit, the preference level stored in the music selection priority level storage unit, in accordance with contents of the input.

In an eighth aspect, the music selection apparatus may further comprise a test music selection unit operable to select plural pieces of music as pieces of test music, from the pieces of music whose data is stored in the music data storage unit, a distance between the plural pieces of music in the impression space being greater than a predetermined distance. In this configuration, the reproduction unit reproduces the pieces of test music in response to the selection of the pieces of test music by the test music selection unit.

In a ninth aspect, the music selection apparatus may further comprise: a stop receiving unit operable to receive from the user an input for stopping reproduction of the piece of music performed by the reproduction unit; and a music selection priority level update unit operable to update the music selection priority level stored in the music selection priority level storage unit, in accordance with a proportion of part of the pieces of music reproduced by the reproduction unit to all pieces of music.

Moreover, the present invention may be provided as a method of selecting music employed in the aforementioned music selection apparatus. In addition, the present invention may be provided as a program which realizes the functions of the aforementioned music selection apparatus by allowing a computer to execute the program, or as a recording medium which stores the program.

According to the present invention, a music selection is made using a music selection priority level which includes either a reproduction history or a preference level, and therefore a music selection which reflects the user's preferences can be made. In addition, according to the present invention, a piece of music is selected taking into account the distance between pieces of music in an impression space. Here, the distance indicates similarity of music. Thus, a music selection which takes into account the distance is, in other words, a music selection made based on two factors, i.e., a music selection priority level and similarity of music. Accordingly, music selection results are not made uniquely based on the music selection priority level, and thus a wide variety of music selection results can be obtained.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a diagram showing exemplary data to be stored in a music database shown in FIG. 1;

FIG. 3 is a diagram illustrating an exemplary impression space in the first embodiment;

FIG. 8 is a diagram showing an exemplary reproduction music list which is displayed on a display section 7;

FIG. 11 is a block diagram illustrating a configuration of a music selection apparatus shown in FIG. 1 which is realized by a computer system;

FIG. 12 is a diagram showing exemplary data to be stored in a music database in a variant of the first embodiment;

FIG. 13 is a diagram showing exemplary data to be stored in a music database in a second embodiment;

FIG. 14 is a diagram showing exemplary data to be stored in a music database in a third embodiment;

DESCRIPTION OF THE PREFERRED EMBODIMENTS

First Embodiment

Figure 1:
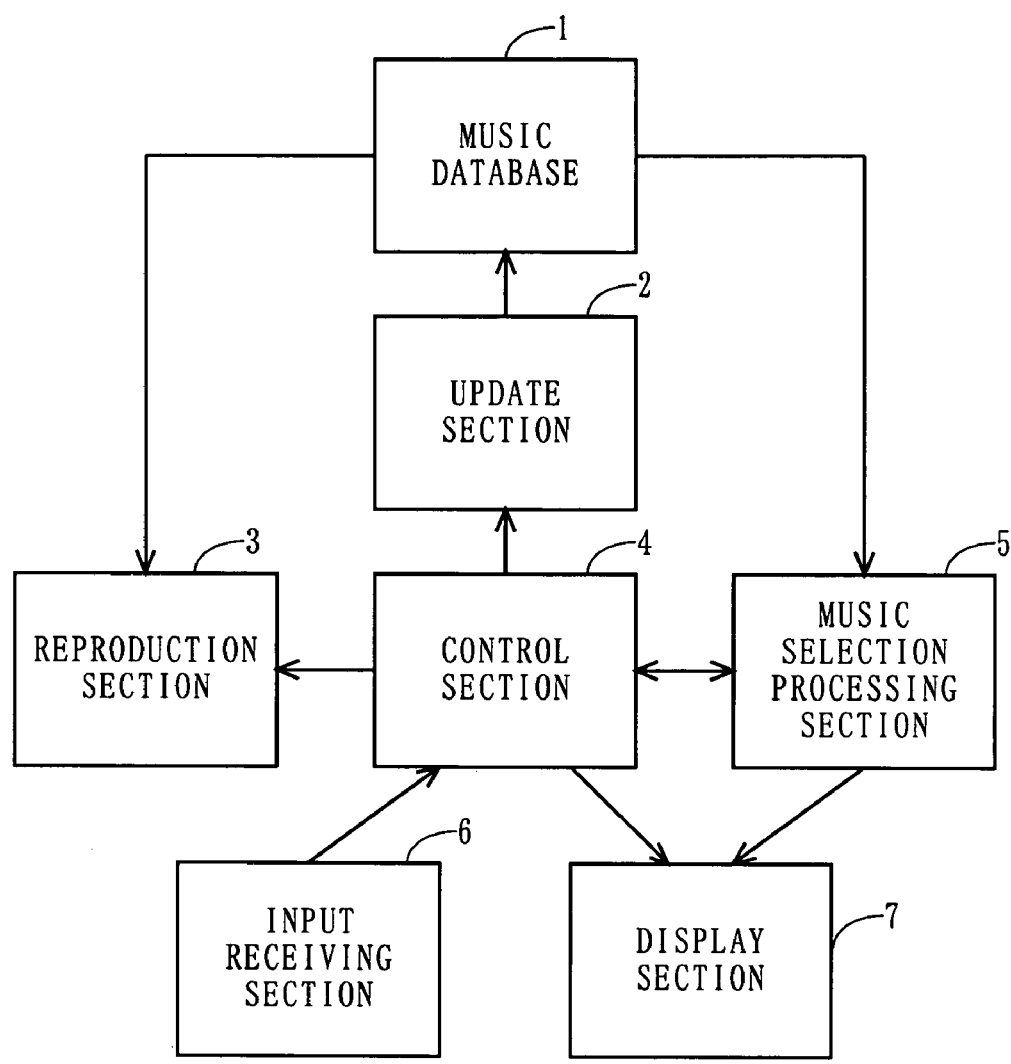
FIG. 1 is a block diagram illustrating a music selection apparatus according to a first embodiment.

First, a music selection apparatus according to a first embodiment of the present invention will be described. FIG. 1 is a block diagram illustrating the music selection apparatus according to the first embodiment. In FIG. 1, the music selection apparatus includes a music database 1, an update section 2, a reproduction section 3, a control section 4, a music selection processing section 5, an input receiving section 6, and a display section 7. The music selection apparatus is used as a car audio system or a jukebox, for example.

In the music database 1 there are stored data on pieces of music and related information about the pieces of music (see FIG. 2 as will be described later). The related information includes, for example, a music title, an artist name, a playing time, and the like. In addition, the music database 1 contains a music selection priority level and an impression amount for each piece of music whose data is stored therein. The contents of the music database 1 can be obtained in any manner. For example, the contents of the music database may be obtained through a recording medium readable by the music selection apparatus, or if the music selection apparatus is capable of communicating with another information processing apparatus, the contents may be obtained through communication.

The music selection priority level is an index used for the process (the music selection process) of selecting a piece of music to be reproduced from the pieces of music whose data is stored in the music database 1. Specifically, the music selection priority level indicates at least either the reproduction history or preference level of a piece of music. The reproduction history of a piece of music includes, for example, the number of reproductions and the date/time of reproduction of the piece of music, and the like. The preference level of a piece of music is a level indicating the user's preferences with respect to the piece of music. The preference level value of a piece of music may be directly set by the user or may be calculated based on the aforementioned reproduction history. In addition, the preference level of a piece of music may be indicated by a numeric value or by two values representing "like" and "dislike".

The impression amount is obtained by quantifying the impression of a piece of music. For example, the impression amount may be indicated by a numeric value representing a parameter such as "intensity" and "refreshness". Although it is preferred that the impression amount have a plurality of parameters, i.e., the impression amount may be indicated by a multidimensional vector, it is also possible that the impression amount has only one parameter, i.e., a one-dimensional scalar. The impression amount is calculated based on the amount of musical characteristics (e.g., a tempo, an average number of sounds, and the like) obtained as a result of an analysis on a music signal of music. For example, the impression amount may be calculated by assigning predetermined weights to the amount of musical characteristics.

The music selection processing section 5 shown in FIG. 1 performs a music selection process. In the music selection process performed by the music selection processing section 5, the impression amount is used in addition to the aforementioned music selection priority level. For example, in the case where the music selection process is performed using only the music selection priority level (e.g., the reproduction history), only pieces of music that are often reproduced will be selected. As a result, almost the same music selection result is obtained every time, whereby the user may get tired of the music selection result. In view of this, in the present invention, a music selection is made using the music selection priority level and the impression amount, making it possible to provide an unwearied, wide variety of music selection results, while reflecting the user's preferences. In the first embodiment, the music selection processing section 5 performs an automatic music selection process which is automatically performed using the music selection priority level and the impression amount, and a normal music selection process which is performed in response to the user's specification of a music title, etc.

The update section 2 updates the contents of the music database 1 in response to an instruction from the control section 4. Specifically, the update section 2 updates a music selection priority level stored in the music selection database 1. The reproduction section 3 reads data on a piece of music stored in the music selection database 1 in response to an instruction from the control section 4 and then reproduces the data. The control section 4 instructs the music selection processing section 5 to perform a music selection process in response to the user's instruction, for example, received through the input receiving section 6, or instructs the update section 2 to update the music selection database 1.

The input receiving section 6 is comprised of an input apparatus such as a button or touch panel. The input receiving section 6 receives various instruction inputs from the user. For example, the input receiving section 6 is used by the user to instruct the music selection processing section 5 to perform a music selection process, to input the preference level of a piece of music, or to instruct to skip a piece of music being reproduced.

The display section 7 is comprised of a display apparatus such as a CRT or liquid crystal display device. On the display section 7 there are displayed, for example, a list (reproduction music list) of pieces of music obtained as a result of the music selection process, and an input screen which is usually used when selecting music.

FIG. 2 is a diagram showing exemplary data to be stored in the music selection database shown in FIG. 1. The music selection database 1 contains a music number, music data, related information, an impression amount, and a music selection priority level, for each piece of music. The music number has a unique value set to identify pieces of music. The music data is data on music, i.e., data representing a music signal of a piece of music. The music data includes, for example, waveform data of music in linear PCM format or compressed data such as AAC. The related information is information related to a piece of music, as described above. The related information includes, for example, a music title, an artist name, an album title, a lyricist, a composer, an arranger, a category, a playing time, or the like. In the first embodiment, the related information includes the music title and playing time of a piece of music.

In the first embodiment, the impression amount is composed of two components (parameters) and represented by a two-dimensional vector. Therefore, each piece of music contained in the music database 1 (i.e., each piece of music whose data is stored in the music database 1) can be represented by a dot in a space with coordinate axes composed of the components of the impression amount. Note that the space is hereinafter referred to as an "impression space". In the first embodiment, the impression amount is represented by a two-dimensional vector, and thus the impression space is a two-dimensional plane. FIG. 3 is a diagram illustrating an exemplary impression space in the first embodiment. Each dot shown in FIG. 3 indicates each piece of music contained in the music data base 1. Note that the impression amount is a numeric value representing the impression that the user gets from listening to a piece of music, and thus if dots representing the impression amounts of plural pieces of music are arranged in the impression space, the dots will be arranged based on similarity of impressions. That is, two pieces of music represented by two dots positioned adjacent to each other in the impression space are similar to each other (i.e., the two pieces of music are of similar impressions). As shown in FIG. 2, in the music database 1, one of two components of the impression amount is stored as an X-coordinate value and the other is stored as a Y-coordinate value.

In addition, in the music data base 1 in FIG. 2, the music selection priority level includes the number of reproductions, the last reproduction date, and the preference score. The number of reproductions is the number of times a piece of music has been reproduced so far. The last reproduction date is the date on which a piece of music was last reproduced. The preference score is an index indicating the level of the user's preferences. The preference score changes in response to the user's input or at the time when the number of reproductions and the last reproduction date are updated.

The contents of the music database 1 can be added or deleted, as necessary. In the first embodiment, in the case of adding a piece of music, the music number is automatically assigned to the piece of music. When music data of the piece of music is cataloged, the impression amount of the piece of music is automatically calculated, and the calculated impression amount is stored in the music database 1. Further, when the music data of the piece of music is cataloged, the number of reproductions is set to "0", the last reproduction date is set to "blank" (in FIG. 2), and the preference score is set to "5" as the initial value.

Figure 4:
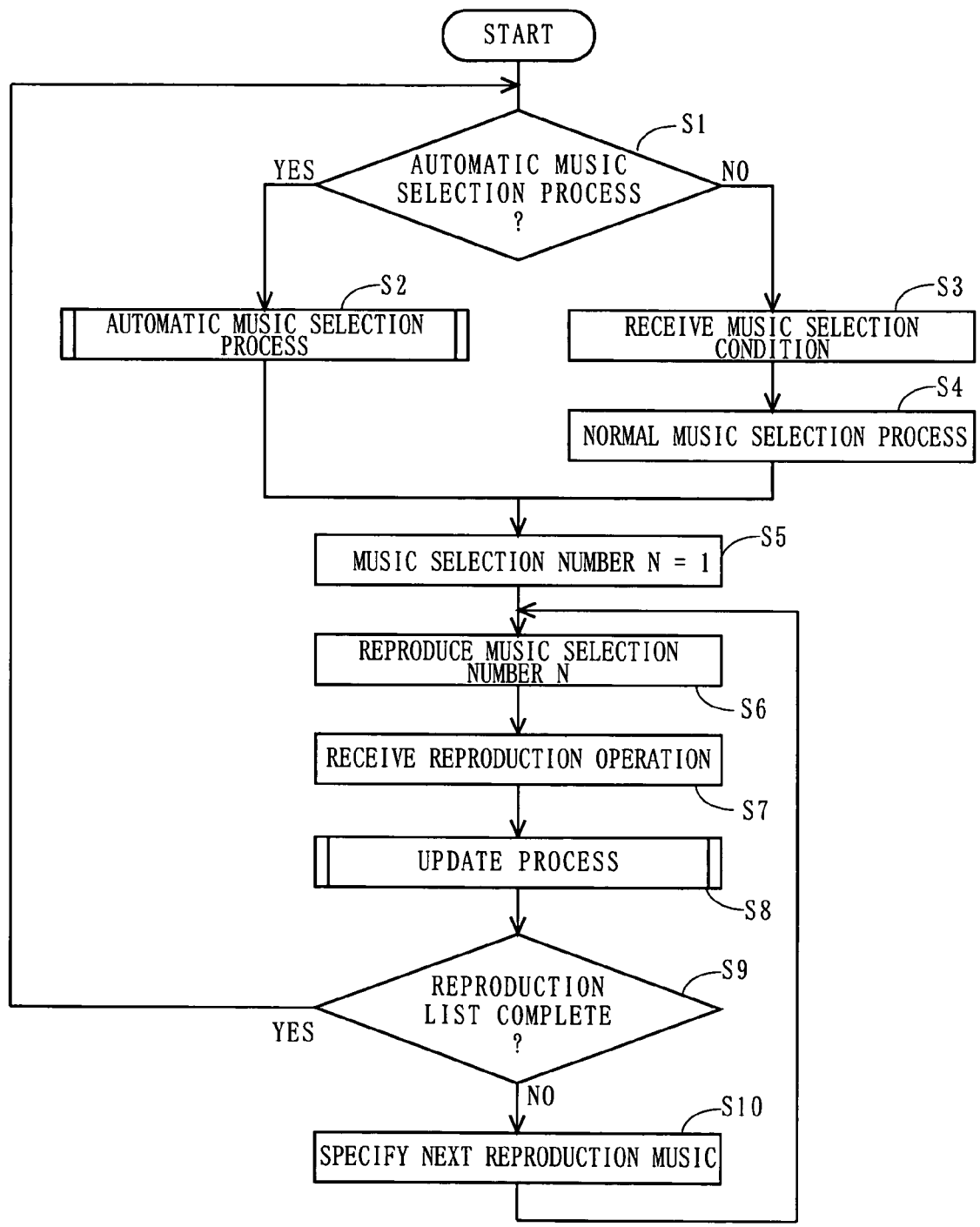
FIG. 4 is a flowchart showing the flow of the process of the music selection apparatus according to the first embodiment.
Figure 5:
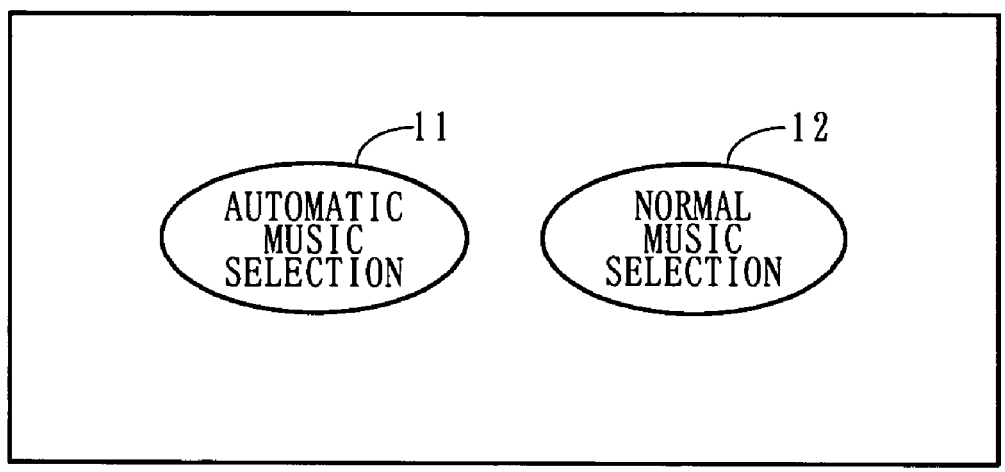
FIG. 5 is a diagram illustrating exemplary buttons provided in an input receiving section 6 and used to select a music selection mode.

The operation of the music selection apparatus will be described below. FIG. 4 is a flowchart showing the flow of the process of the music selection apparatus according to the first embodiment. The process shown in FIG. 4 starts by turning on the power of the music selection apparatus, for example. First, at step S1, the control section 4 determines a music selection mode. The music selection mode includes two modes, i.e., an automatic music selection mode which performs the above-described automatic music selection process and a normal music selection mode which performs a normal music selection process. At step S1, it is determined whether or not to perform an automatic music selection process, i.e., whether the music selection apparatus performs an automatic music selection process or a normal music selection process. Here, the selection of the music selection mode is made by the user. The input receiving section 6 has buttons used to select the music selection mode. FIG. 5 is a diagram illustrating exemplary buttons provided in the input receiving section 6 and used to select the music selection mode. As shown in FIG. 5, the input receiving section 6 includes an automatic music selection button 11 and a normal music selection button 12. The user can select the music selection mode by pressing either the automatic music selection button 11 or the normal music selection button 12. In the first embodiment, either the automatic music selection mode or the normal music selection mode must be selected. The control section 4 determines whether or not to perform an automatic music selection process in accordance with the user's selection received by the input receiving section 6. If at step S1, it is determined to perform an automatic music selection process, the process of step S2 is performed. If at step S1, it is determined not to perform an automatic music selection process (i.e., it is determined to perform a normal music selection process), the processes of steps S3 and S4 are performed.

Figure 6:
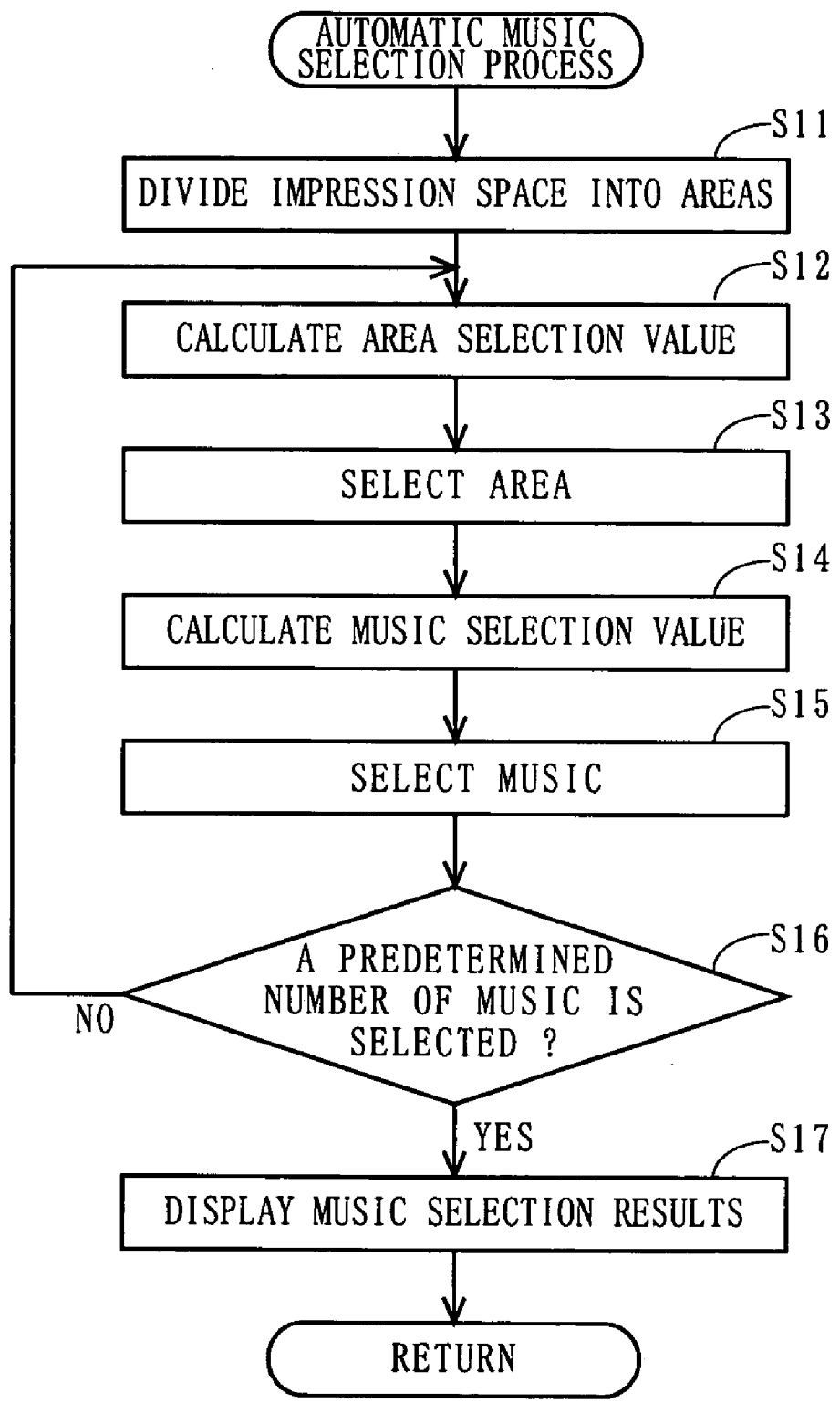
FIG. 6 is a flowchart showing a detailed process of step S2 shown in FIG. 4.
Figure 7:
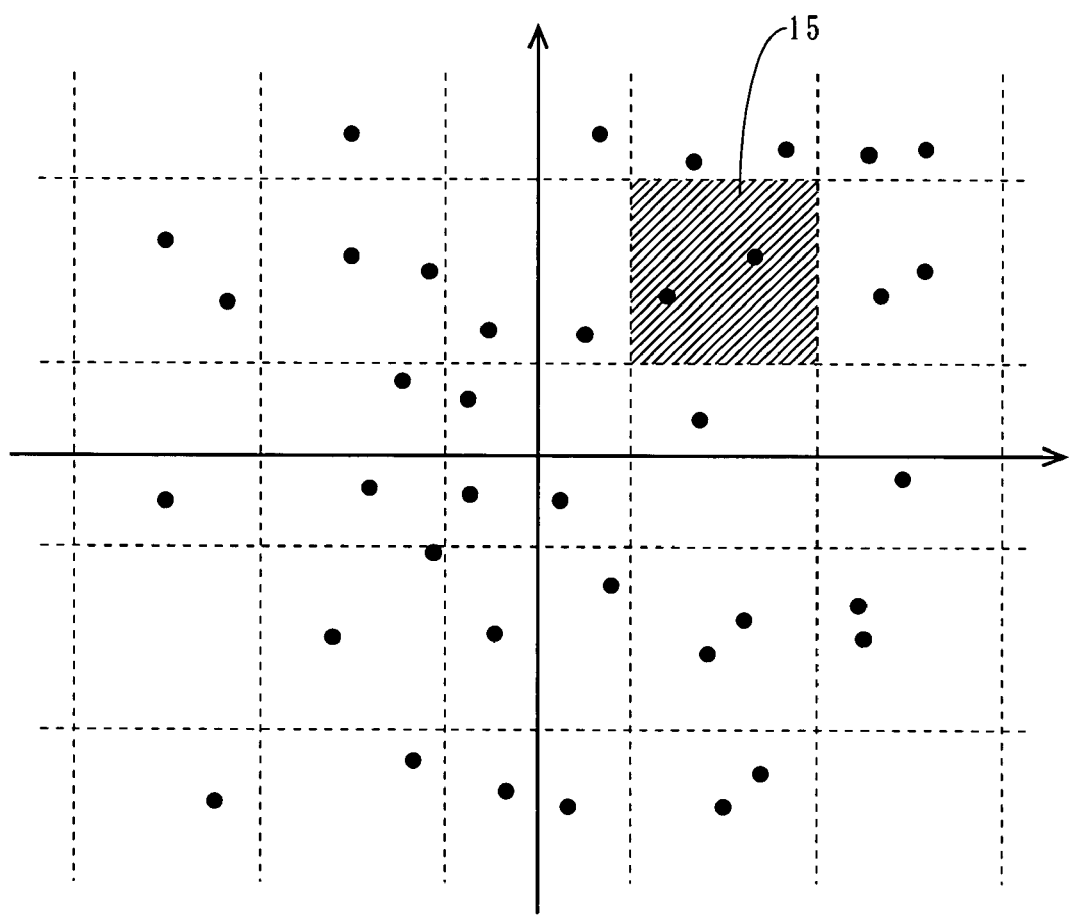
FIG. 7 is a diagram illustrating an exemplary impression space divided into a plurality of areas.

Next, the automatic music selection process of step S2 is described. FIG. 6 is a flowchart showing a detailed process of step S2 shown in FIG. 4. The automatic music selection process is performed by the music selection processing section 5 in response to an instruction by the control section 4. First, at step S11, the music selection processing section 5 divides the impression space into a plurality of areas. FIG. 7 is a diagram illustrating an exemplary impression space divided into a plurality of areas. In the first embodiment, the impression space is divided into a plurality of areas by straight lines perpendicular to an X or Y axis. Information indicating each area is stored in a storage section (not shown in FIG. 1) built in the music selection apparatus. As shown in FIG. 7, pieces of music included in a single area are close to each other in terms of distance in the impression space. Therefore, it can be said that pieces of music included in the same area are similar pieces of music (i.e., the pieces of music are of similar impressions). Note that although in FIG. 7 the areas are defined by evenly dividing the impression space by straight lines, any method can be employed for defining the areas. For example, the impression space may be divided by curves or may be divided such that each area includes the same number of pieces of music. In addition, at step S11, the music selection processing section 5 may define the areas in the same way every time or may define the areas in a different manner. An area number is sequentially assigned to a plurality of divided areas in the order starting with one. Here, j=BA (i), where i (an arbitrary integer) is the music number of a piece of music and j (an arbitrary integer) is an area where the piece of music belongs (i.e., an area with the area number "j").

After step S11, the music selection section 5 performs the process of determining a piece of music to be reproduced. In the first embodiment, first, a music selection target area is selected (steps S12 and S13). Next, a piece of music, which will be a music selection result, is selected from pieces of music included in the music selection target area (steps S14 and S15). The music selection target area is a region present in the impression space, and from the region a piece of music is selected as a music selection result. Steps S12 to S15 will be described in detail below.

At step S12, the music selection processing section 5 calculates an area selection value EA (j) for each area. The area selection value is a numeric value used to select a music selection target area from the areas in to which the impression space is divided. The area selection value is an index indicating the probability that a given area is selected as a music selection target area. A specific method of calculating the area selection value will be described below.

To calculate the area selection value, the music selection processing section 5 first calculates a frequency of hearing LA (i) and a preference level TA (i) for each piece of music contained in the music database 1. The frequency of hearing LA (i) of a piece of music i (i.e., a piece of music with the music number "i") is calculated based on the music selection preference level of the music i. Specifically, if the number of reproductions of the music i is PC (i), if the last reproduction date of the music i is LT, and if today's date is NT, the frequency of hearing LA (i) of the music i is calculated by the following equation (1):

$$LA(i)=wLA1*PPC(i)+wLA2*PLT(i) \quad (1)$$

where wLA1 is a coefficient representing the degree of reflection of the number of reproductions with respect to the frequency of hearing LA (j); and wLA2 is a coefficient representing the degree of reflection of the last reproduction date with respect to the frequency of hearing LA (j). Note, however, that in equation (1), if PC(i)<10, then PPC(i)=PC(i);

if PC(i)>10, then PPC(i)=10;

if NT−LT(i)<365, then PLT(i)=365−(NT−LT(i)); and if NT−LT(i)>365, then PLT(i)=0.

It can be seen from equation (1) that the greater the number of reproductions of a piece of music, the greater the value of the frequency of hearing LA (i) of the piece of music, and that the later the last reproduced date, the greater the value of the frequency of hearing LA (i).

In addition, if the preference score of the music i is TP (i), the preference level TA (i) of the music i can be calculated by the following equation (2):

$$TA(i)=PTP(i) \quad (2).$$

Note, however, that in equation (2), if TP(i)<10, then PTP(i)=TP(i); and if TP(i)>10, then PTP(i)=10.

It can be seen from equation (2) that the preference level TA (with the upper limit of 10) becomes higher, as the preference score TP (i) goes higher.

Note that although in equations (1) and (2) the maximum values of PPC, PLT, and PTP are set to 10, 365, and 10, respectively, the maximum values may be set to other values.

The music selection processing section 5 calculates the frequency of hearing LA (i) and the preference level TA (i) for all pieces of music contained in the music data base 1. Thereafter, the music selection processing section 5 calculates the area selection value EA for each area, based on the calculated frequency of hearing LA (i) and preference level TA (i). Specifically, the area selection value EA (j) of an area j is calculated by performing the following equation (3) on all pieces of music i which satisfy j=BA (i):

$$EA(j)=\Sigma(wEA1*LA(i)+wEA2*TA(i)) \quad (3)$$

where wEA1 is a coefficient representing the degree of reflection of the frequency of hearing LA in respect of area selection, and wEA2 is a coefficient representing the degree of reflection of the preference level TA in respect of area selection. The music selection processing section 5 calculates the area selection value of each area by performing the calculation of equation (3) on each area.

After step S12, at step S13, the music selection processing section 5 selects a music selection target area by using the area selection values EA. Specifically, the music selection processing section 5 selects an area with probability proportional to the area selection values EA; that is, the music selection processing section 5 selects an area such that an area with a greater area selection value EA is selected with higher probability. By this, an area with a high music selection priority level (i.e., an area which includes pieces of music with a high music selection priority level) is selected on a priority basis as a music selection target area. That is, a piece of music having a similar impression to music the user often hears is more likely to be selected.

By steps S12 and S13, a music selection target area is selected. At steps S14 and S15, a piece of music to be selected is determined from among pieces of music belonging to a selected music selection target area. For example, in the case where a hatched area 15 in FIG. 7 is a music selection target area, a piece of music to be selected is determined by selecting one dot from the dots present in the music selection target area 15. Specifically, at step S14, first the music selection value is calculated for each piece of music belonging to a music selection target area selected at step S13. The music selection value is a numeric value used to determine a piece of music to be selected, and is an index indicating the probability that a given piece of music is selected as a music selection target. A specific calculation method for the music selection value will be described below.

To calculate the music selection value, the music selection processing section 5 first calculates the frequency of hearing LS (i) and the preference level TS (i) for each piece of music belonging to a music selection target area. Specifically, the frequency of hearing LS (i) is calculated by the following equation (4):

$$LS(i)=wLS1*PPC(i)+wLS2*PLT(i) \qquad (4)$$

where wLS1 is a coefficient representing the degree of reflection of the number of reproductions with respect to the frequency of hearing LS, and wLS2 is a coefficient representing the degree of reflection of the last reproduction date with respect to the frequency of hearing LS. Here, PPC (i) and PLT (i) are the same as those shown in equation (1). The preference level TS (i) is calculated by the following equation (5):

$$TS(i)=PTP(i) \qquad (5).$$

Note that in equation (5), PTP (i) is the same as that shown in equation (2).

The music selection processing section 5 calculates the frequency of hearing LS (i) and the preference level TS (i) for all pieces of music belonging to the music selection target area. Subsequently, the music selection processing section 5 calculates the music selection value ES for each piece of music based on the calculated frequency of hearing LS and preference level TS. Specifically, the music selection value ES (i) of the music i is calculated by the following equation (6):

$$ES(i)=wES1*LS(i)+wES2*TS(i) \qquad (6)$$

where wES1 is a coefficient representing the degree of reflection of the frequency of hearing LS in respect of music selection, and wES2 is a coefficient representing the degree of reflection of the preference level TS in respect of music selection. The music selection processing section 5 calculates the music selection value for each piece of music by performing the calculation of equation (6) on each piece of music belonging to the music selection target area.

After step S14, at step S15, the music selection processing section 5 selects a piece of music which will be a music selection result, using the music selection values ES. Specifically, a piece of music is selected from pieces of music belonging to the music selection target area, with probability proportional to the music selection values ES. By this, an area with a higher frequency of hearing or an area with a higher preference level is more likely to be selected as a music selection target area. That is, a piece of music the user often hears is selected on a priority basis.

Note that the music selection processing section 5 may be configured to select a piece of music randomly from a music selection target area, instead of performing the processes of steps S14 and S15. In such a case too, as with the case of performing the processes of steps S14 and S15, apiece of music having a similar impression to music the user often hears is more likely to be selected.

In addition, the process contents of the processes of steps S12 to S15 may be changed depending on the number of reproduction histories stored in the music database 1. Specifically, in the case where the number of reproductions is low, there is a possibility that the reproduction histories do not sufficiently reflect the user's preferences; therefore, in such a case, instead of performing the processes of steps S12 to S15, the music selection target area may be randomly selected, or a piece of music may be randomly selected from pieces of music included in a music selection target area. In addition, in the case where the number of reproductions is low, a piece of music with a fewer number of reproductions may be selected on a priority basis to increase the number of reproduction histories.

After the process of step S15 has been completed, at step S16, the music selection processing section 5 determines whether a predetermined number of music has been selected. The predetermined number may be a preset number or may be set by the user when the user selects an automatic music selection. If, at step S16, it is determined that the predetermined number of music has not been selected, the music selection processing section 5 repeats the processes of steps S12 to S15. The processes of steps S12 to S15 are repeated until the predetermined number of music has been selected.

If, at step S16, it is determined that the predetermined number of music has been selected, the music selection processing section 5 performs the process of step S17. Specifically, at step S17, the music selection processing section 5 displays on the display section 7 a list (reproduction music list) of pieces of music obtained as a result of the music selection process. FIG. 8 is a diagram showing an exemplary reproduction music list which is displayed on the display section 7. On the reproduction music list shown in FIG. 8, there are displayed a music selection number indicating the order of selected pieces of music in the list and the title and playing time of each piece of music. Note that the reproduction music list may also include a music number, an artist name for a piece of music, etc., in addition to the items shown in FIG. 8. After step S17, the music selection processing section 5 completes the automatic music selection process.

In the above-described automatic music selection process, all pieces of music included in a music selection target area have a possibility of being selected, and therefore the user can obtain a wide variety of music selection results. Further, the pieces of music contained in the music selection target area are similar to one another in impression; therefore, whatever piece of music in the music selection target area is selected, there is no possibility that a type of music which is completely different from the user's preferred type is selected. That is, a music selection can be made based on the user's preferences.

There may be a case where the user's preferences do not completely correspond to the music selection priority level. For example, the user may want to hear a different type of music that the user does not usually hear. In the first embodiment, by changing the settings of steps S13 and S15, it is also possible to select a type of music the user does not usually hear on a priority basis. Specifically, at step S13, the music selection processing section 5 may be configured to select an area with probability inversely proportional to the area selection values EA. By this, an area with a lower music priority level is more likely to be selected as a music selection target area. That is, a type of music the user usually does not hear (i.e., a piece of music having a different impression from music the user usually hears) is more likely to be selected. In addition, at step S15, the music selection processing section 5 may be configured to select a piece of music with probability inversely proportional to the music selection values ES. By this, a piece of music with a lower frequency of hearing or a piece of music with a lower preference level is more likely to be selected. That is, a piece of music which has a similar impression to music the user usually hears, but which is not reproduced often by the user is selected on a priority basis.

By changing the combination of the settings of steps S13 and S15, the music selection apparatus can select music in various manners. For example, at steps S13 by selecting an area with probability proportional to the area selection values EA, and at step S15 by selecting a piece of music with probability inversely proportional to the music selection values ES, it is possible to select a piece of music which is a type of music usually heard by the user but which is not often heard by the user, on a priority basis. In addition, for example, at step S13 by selecting an area with probability inversely proportional to the area selection values EA, and at step S15 by selecting a piece of music with probability proportional to the music selection values ES, it is possible to select a piece of music which is a type of music usually not heard by the user but which is relatively often heard by the user, on a priority basis.

At step S2, the process of selecting a piece of music is performed at two stages, i.e., the process of selecting a music selection target area (steps S12 and S13) and the process of selecting a piece of music from pieces of music included in the music selection target area (steps S14 and S15). However, in other embodiments, it is also possible to directly calculate an overall music selection value TES (i) of a piece of music i by the following equation (7):

$$TES(i)=EA(BA(i))*ES(i) \qquad (7).$$

In equation (7), EA is the same as the aforementioned area selection value. In addition, ES is the same as the aforementioned music selection value. The music selection processing section 5 calculates the overall music selection value TES for each piece of music contained in the music database 1. Then, the music selection processing section 5 selects a piece of music with probability based on the total music selection values TES.

The area selection value EA of a given piece of music is a numeric value obtained taking into account the music selection priority levels of other pieces of music included in the same area in the impression space. That is, the area selection value EA of a given piece of music is a numeric value obtained by changing the music selection priority levels of other pieces of music in the same area in the impression space based on the positional relationship with the other pieces of music. Therefore, the area selection value EA of a given piece of music is a value set in association with other pieces of music present around the given piece of music in the impression space. In view of this, the area selection value EA may be referred to as an "association level". Namely, in equation (7), the overall music selection value TES (i) of a piece of music i can be calculated using the association level EA (i) of the music i and the music selection value ES (i) obtained using the music selection priority level of the music i. Hence, in the music selection process, a piece of music may be selected with probability based on the association level and music selection priority level of the piece of music.

Although in equation (7) a piece of music is selected with probability proportional to both the association level EA and the music selection value ES, it is also possible to select a piece of music with probability inversely proportional to one or both of the association level EA and the music selection value ES. Specifically, equation (7) can be expressed by the following equation (7)':

$$TES(i)=F1(EA(BA(i)))*F2(ES(i)) \qquad (7)'.$$

In equation (7)', F1 (x) is a function representing the reflection method of the area selection value EA with respect to the probability of selecting music. That is, if F1 (x)=a*x, it means that the area selection value EA is in proportion to the probability. In other words, a piece of music with a greater area selection value EA is selected with higher probability. On the other hand, if F1 (x)=b/x, it means that the area selection value EA is in inverse proportion to the probability. Here, F2 (x) is a function representing the reflection method of the music selection value ES with respect to the probability of selecting music.

Moreover, in other embodiments, it is also possible to select a piece of music using an impression amount and a music selection priority level, instead of dividing the impression space into areas. Specifically, the music selection processing section 5 first calculates an impression amount and a music selection value (i.e., the aforementioned ES) for each piece of music contained in the music database 1. Subsequently, by using spline interpolation, for example, the music selection value of all positions in the impression space is estimated based on the calculated impression amounts and music selection values. Then, one dot position (reference position) is selected from all positions in the impression space, with probability proportional (or inversely proportional) to the estimated music selection value. Specifically, one dot in the impression space is selected such that the greater the estimated music selection value of a piece of music, the higher the probability that the piece of music is selected. Finally, a piece of music positioned closest to the coordinates of the selected reference position is determined as a music selection result. In this manner, a music selection using an impression amount and a music selection priority level may be made.

Referring back to the description of FIG. 4, if at step S1, it is determined not to perform the automatic music selection process (i.e., it is determined to perform the normal music selection process), the normal music selection process is performed. The normal music selection process is the process of selecting music based on various information (e.g., a title, an impression amount, and the like) to be inputted by the user. Specifically, first, at step S3, the music selection processing section 5 receives an input as to a music selection condition from the user through the input receiving section 6. At step S3, an input screen for receiving a music selection condition is displayed on the display section 7.

Figure 9:
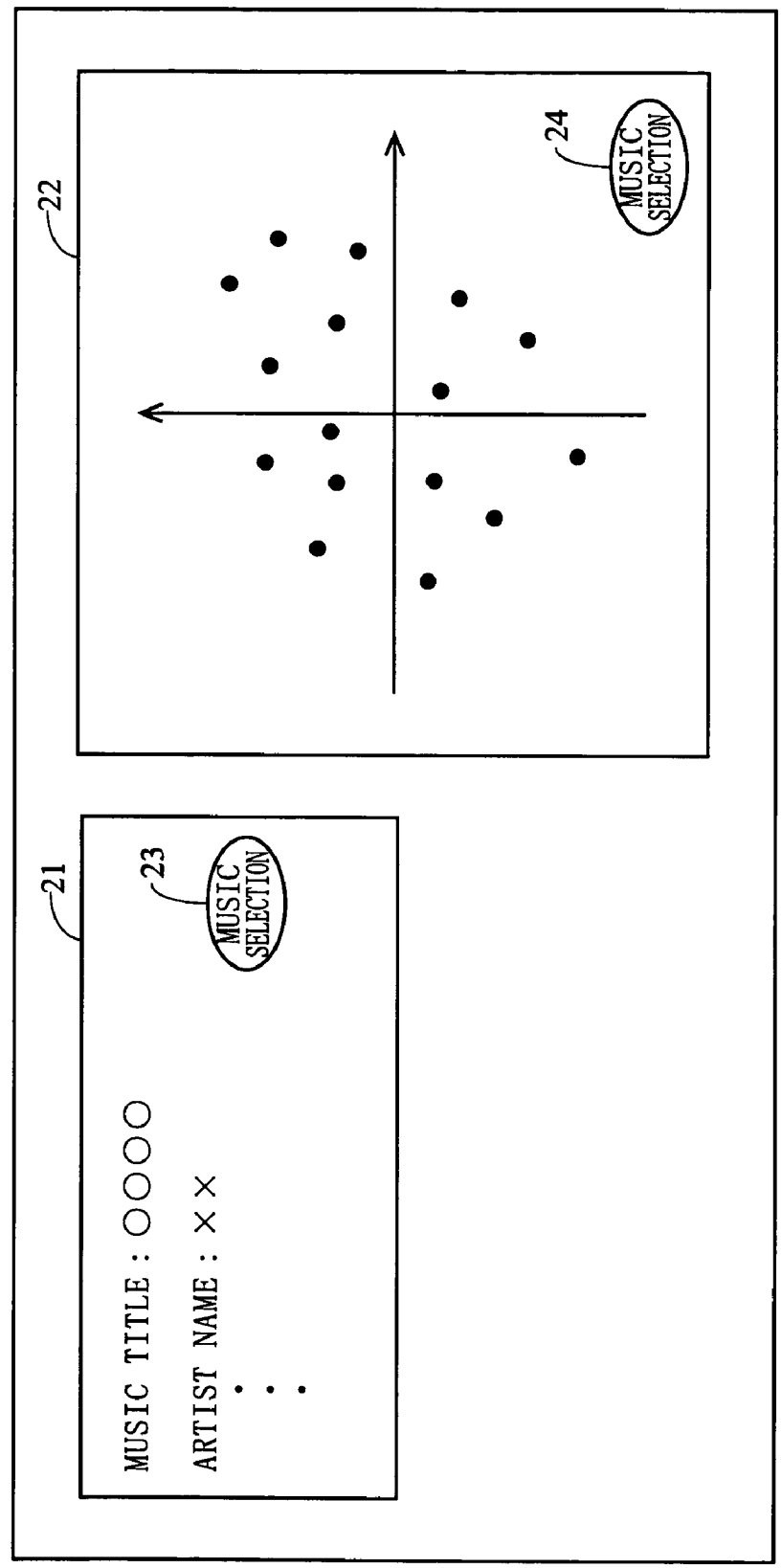
FIG. 9 is a diagram illustrating an exemplary input screen for receiving a music selection condition.

FIG. 9 is a diagram illustrating an exemplary input screen for receiving a music selection condition. In the present embodiment, as shown in FIG. 9, on the input screen there are displayed a text input receiving section 21 and an impression amount input receiving section 22. On the text input receiving section 21 there is displayed related information such as a music title, an artist name of music, and the like. The user can specify a music selection condition by inputting related information. Then, by the user specifying a music selection button 23, the music selection condition is determined. Note that a music selection made by an input from the text input receiving section 21 is hereinafter referred to as a "text music selection".

On the impression amount input receiving section 22 there is displayed the impression amount of each piece of music contained in the music database 1. That is, an impression space is displayed. In the first embodiment, the impression amount is represented by two-dimensional data, and thus each piece of music is displayed as one dot in the plane. The user can specify a music selection condition by specifying a given dot in the impression space displayed on the impression amount input receiving section 22. Then, by the user specifying a music selection button 24, the music selection condition is determined. Note that a music selection made by an input from the impression amount input receiving section 22 is hereinafter referred to as an "impression amount music selection".

At step S3, an input as to related information or an input specifying an impression amount is received from the user. Subsequently, at step S4, the music selection processing section 5 selects a piece or plural pieces of music from pieces of music contained in the music database 1, based on a music selection condition inputted at step S3. Specifically, in the case of the text music selection, a piece of music having related information which matches a specified music selection condition is selected. In the case of the impression amount music selection, a piece of music positioned closest to a specified position is selected from pieces of music contained in the music database 1. In either music selection method, as with step S17, the related information about the selected pieces of music is displayed on the display section 7 as a reproduction music list. Note that in the, normal music selection process, the music selection processing section 5 may be configured to select plural pieces of music with respect to one music selection condition or may be configured to receive a music selection condition a plurality of times.

The reproduction music list obtained at step S2 or S4 is outputted to the control section 4 from the music selection processing section 5. At step S5, the control section 4 initializes a counter N which indicates a music selection number in the reproduction music list; that is, N=1 is set. Here, the control section 4 detects the list length L of the reproduction music list, i.e., the number of pieces of music included in the reproduction music list.

Subsequent to step S5, at step S6, the control section 4 allows the reproduction section 3 to reproduce a piece of music. Specifically, the control section 4 notifies the reproduction section 3 of the music number of the piece of music having a music selection number which corresponds to the value of the counter N. The reproduction section 3 reads music data of the piece of music corresponding to the music number, from the music database 1 and reproduces the music data.

Subsequent to step S6, at step S7, the control section 4 receives, through the input receiving section 6, a reproduction operation performed by the user while the piece of music is being reproduced at step S6. Specifically, the reproduction operation is the operation of skipping the piece of music being reproduced. When the control section 4 receives the reproduction operation while the piece of music is being reproduced, the control section 4 stops the piece of music being reproduced. Further, the control section 4 instructs the update section 2 to update the music selection priority level of the piece of music. Specifically, the control section 4 provides the music number and reproduction time of the piece of music to the update section 2. In the case where the piece of music has been reproduced until the end without the user performing a reproduction operation, the control section 4 assumes that this situation is the same as where a skip button is pressed at the end of reproduction of the piece of music, and thus provides the music number and reproduction time (in this case, the reproduction time is equal to the playing time) of the piece of music to the update section 2.

Figure 10:
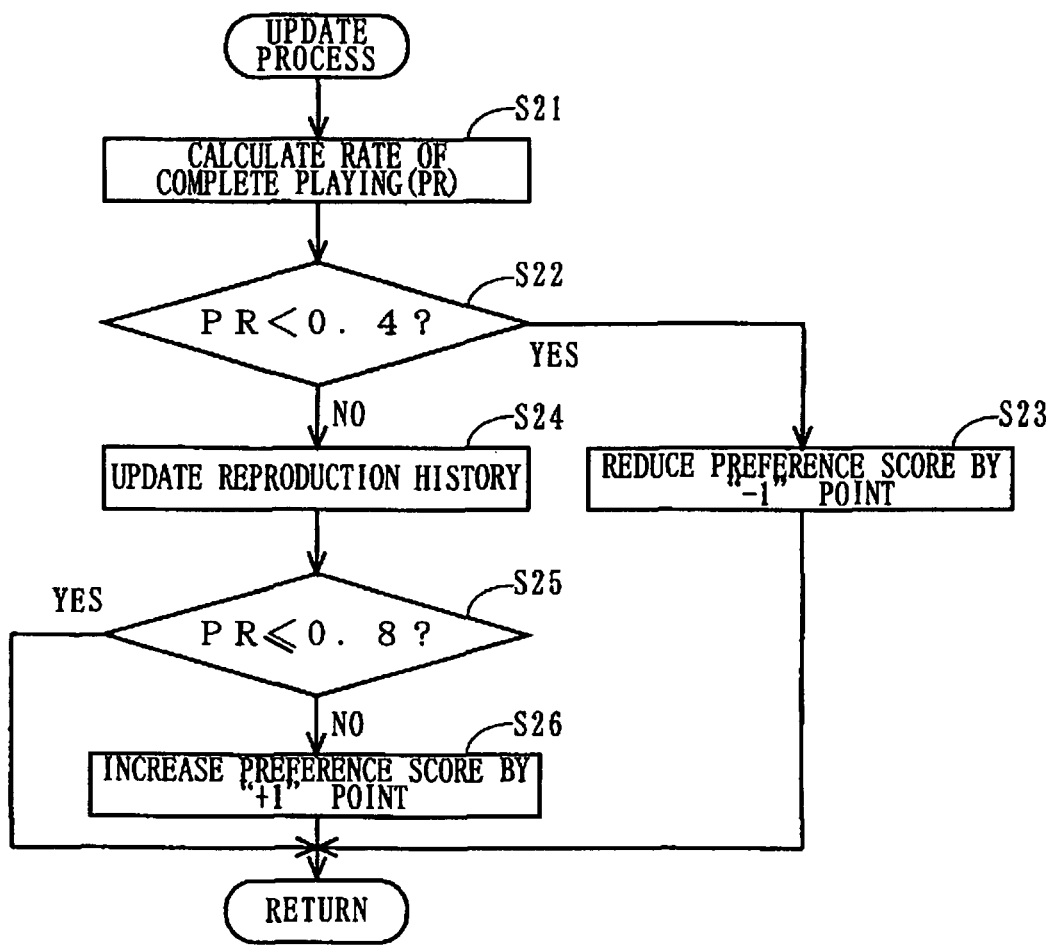
FIG. 10 is a flowchart showing the flow of a detailed process of step S7 shown in FIG. 4.

At step S8, the update section 2 performs an update process. The update process is the process of updating the contents of the music database 1 using information about update received from the control section 4. FIG. 10 is a flowchart showing the flow of a detailed process of step S7 shown in FIG. 4. In the update process, first, at step S21, the update section 2 calculates the rate of complete playing of a piece of music based on the reproduction time of the piece of music reproduced at step S6 and on the playing time of the piece of music stored in the music database 1. The rate of complete playing PR of apiece of music is calculated by the following equation (8):

$$PR=PT/ST \quad (8)$$

where PT is a reproduction time and ST is the playing time of the piece of music. By equation (8), in the case where a piece of music is reproduced until the end without the user performing the reproduction operation, the rate of complete playing PR is such that PR=1.0.

At step S22, the update section 2 determines whether the rate of complete playing PR is smaller than 0.4. If it is, the update section 2 performs the process of step S23. Specifically, at step S23, the update section 2 reduces the preference score of the piece of music reproduced at step S6 by one point. More specifically, the update section 2 reduces the preference score of the piece of music stored in the music database 1 by one point and updates the preference score. Here, as a result of reduction, if the preference score becomes smaller than 0, the preference score is set to 0. After step S22, the update section 2 completes the update process.

On the other hand, if the rate of complete playing PR is 0.4 or greater, the update section 2 performs the process of step S24. Specifically, at step S24, the update section 2 updates the reproduction history of the piece of music reproduced at step S6. More specifically, the update section 2 increases the number of reproductions of the piece of music stored in the music database 1 by one and updates the number of reproductions and also updates the last reproduction date to today's date.

At step S25 subsequent to step S24, the update section 2 determines whether the rate of complete playing PR is greater than 0.8. If at step S25, the rate of complete playing PR is determined to be greater than 0.8, at step S26 the update section 2 increases the preference score of the piece of music by one point. Specifically, the update section 2 increases the preference score of the piece of music stored in the music database 1 by one point and updates the preference score. After step S26, the update section 2 completes the update process. On the other hand, if at step S25, the rate of complete playing PR is determined to be 0.8 or smaller, the update section 2 completes the update process.

As described above, in the update process of step S8, the number of reproductions and the last reproduction date of a piece of music are updated if the rate of complete playing PR of the piece of music is greater than 0.8, i.e., if the user hears the piece of music for a certain amount of time. Therefore, if the user performs a skip operation immediately after a piece of music is reproduced, the reproduction history of the piece of music is not updated. That is, in such a case, it is assumed that the piece of music is not user's preferred music, and thus the music selection apparatus does not update the reproduction history of the piece of music. By this, it is possible to create the reproduction history which reflects the user's preferences more properly. If the reproduction history is not updated with regard to all pieces of music which are skipped, even in the case where only the end part of a piece of music is skipped, the reproduction history of the piece of music will not be updated; as a result, the user's preferences may not be properly reflected. On the other hand, in the above-described update process, even if a piece of music is not reproduced until the end, if the piece of music is reproduced for a certain period of time, the piece of music is assumed to be the user's preferred music and thus the reproduction history of the piece of music is updated. Therefore, the reproduction history can be updated so as to properly reflect the user's preferences.

In the case where the next piece of music to be reproduced after a piece of music being currently reproduced is displayed on the display section 7, it is not necessary to perform an update process, because there is a possibility that the user skips the currently reproduced music to hear the next music. In this case, since association between the skip operation and the user's preferences of the currently reproduced music is weak, it is possible not to perform an update process. As described above, the contents of the update process may be changed in accordance with the display contents of the display section 7.

Referring back to the description of FIG. 4, at step S9, the control section 4 determines whether all pieces of music included in the reproduction music list have been reproduced. Specifically, the control section 4 determines whether the list length L of the reproduction music list matches the counter N which represents the current music selection number; if it does, it is determined that all pieces of music included in the reproduction music list have been reproduced. Thus, if at step S9, it is determined that all pieces of music included in the reproduction music list have been reproduced, the control section 4 performs the process of step S1. Thereafter, the processes of steps S1 to S10 are repeated. On the other hand, if at step S9, it is determined that at least one piece of music included in the reproduction music list has not been reproduced, the control section 4 performs the process of step S10. Specifically, at step S10, the control section 4 increases the value of the counter N by one. After step S10, the control section 4 performs the process of step S6. Thereafter, the control section 4 repeats the processes of steps S6 to S10 until all pieces of music included in the reproduction music list have been reproduced. That is all for the description of the flowchart shown in FIG. 4.

The music selection apparatus shown in FIG. 1 can be realized by allowing a general computer system to execute a predetermined program. FIG. 11 is a block diagram illustrating a configuration of a music selection apparatus shown in FIG. 1 which is realized by a computer system. In FIG. 11, the computer system includes a computer 30 which serves as a music selection apparatus; and a recording medium 37 readable by the computer 30. The computer 30 includes a processing apparatus 31, a music reproduction apparatus 32, a disk drive apparatus 33, a display apparatus 34, an input apparatus 35, and a storage apparatus 36.

A program for allowing the computer to function as a music selection apparatus is recorded on the recording medium 37. As the recording medium 37, any type of recording media readable by the computer can be used, such as a flexible disk, an optical disk, or the like. The disk drive apparatus 33 reads the program from the recording medium 37. The processing apparatus 31 comprises a CPU, a memory, and the like, and realizes the functions of the control section 4, the music selection processing section 5, and the update section 2 shown in FIG. 1, by executing the program. The music database 1 shown in FIG. 1 can be realized by the storage apparatus 36. Note that the program may be supplied to the computer through a recording medium or through data delivery over the Internet or the like. By installing the program on a given computer, the computer is allowed to function as a music selection apparatus.

The process in the music selection apparatus may be performed by a hardware apparatus which is built in or connected to the computer, or the computer may perform a part of the process on software.

Although in the present embodiment, the reproduction operation is described as a skip operation, the reproduction operation may include a rewinding operation for returning to the start of a piece of music or a stop operation for stopping the reproduction of a piece of music. In the case where the rewinding operation is performed during the process of receiving a reproduction operation of step S7 shown in FIG. 4, processing may be configured to return to step S6 without performing the process of step S10 so that a piece of music is reproduced from the start. In the case of a stop operation, processing may be configured to always return to step S1 without determining a condition at step S9. In either case of the rewinding operation or the stop operation, the update process of step S8 is performed, and thus the update process for the music database 1 is performed with the same content as that for the skip operation.

In addition, it is also possible to allow the user to directly input the preference level of a piece of music while the piece of music is being reproduced. For example, the user may be allowed to perform the operation of increasing/reducing the preference score of a piece of music by one point while the piece of music is being reproduced.

In addition, although in the first embodiment the update process is performed in both cases, i.e., the automatic music selection process and the normal music selection process, in other embodiments the update process is not necessarily performed. For example, in the automatic music selection mode, music is not selected based on the user's express intentions and thus performing an update process on the music selection result obtained in the automatic music selection process may not always provide a music selection priority level which properly reflects the user's preferences. Therefore, in the case of performing the automatic music selection process, a part or all of the update process may be omitted.

In the first embodiment, the last reproduction date is used as the reproduction history; however, in other embodiments the date/time of reproduction may be used as the reproduction history. FIG. 12 is a diagram showing exemplary data to be stored in a music database in a variant of the first embodiment. In FIG. 12, the music database 1 stores not only the date on which a piece of music was last reproduced, but also all the dates on which the piece of music has been reproduced so far. The music database may store such data such as the one shown in FIG. 12. In the case of using the music database shown in FIG. 12, for example, the music selection process may be performed using only such reproduction dates (e.g., the reproduction dates indicating June to August) stored in the music database that correspond to the current season (e.g., summer). This allows the user to obtain music selection results based on seasons. In addition, by storing information about the reproduction date in detail (for example, up to the unit of second), the user can obtain music selection results based on time periods.

Second Embodiment

A music selection apparatus according to a second embodiment of the present invention will be described now. The music selection apparatus according to the second embodiment performs a music selection process using additional information, in addition to an impression amount and a music selection priority level. Note that the configuration of the music selection apparatus is the same as that shown in FIG. 1. The difference between the first and second embodiments will be mainly described below.

FIG. 13 is a diagram showing exemplary data to be stored in a music database in the second embodiment. The music database shown in FIG. 13 is such that additional information is further included in the music database shown in FIG. 2. Here, the additional information is information about an appropriate season, for example. The information about an appropriate season indicates which piece of music is appropriate for which season. For example, the music database shown in FIG. 13 shows that a piece of music with the music number "1" is appropriate for spring. Note that the additional information may be information that cannot be automatically provided, or may not be provided to all pieces of music. In addition, the additional information for a piece of music may be inputted by the user or may be additionally inputted from an external apparatus, at the time of or after cataloging the piece of music.

The music selection process using additional information will be described below. In the second embodiment, the music selection processing section 5 uses a music selection reference AS (i) based on additional information, when calculating a music selection value ES (i) described in the first embodiment. The AS (i) is expressed by the following equation (9):

$AS(i)=3$ (an appropriate season for music $i$=summer)

$AS(i)=1$ (an appropriate season for music $i$=spring or fall)

$AS(i)=0$ (an appropriate season for music $i$=winter)       (9).

As shown in equation (9), a value is set to AS (i) based on an appropriate level between the appropriate season for a piece of music and the current season. Note that equation (9) is used in the case where the current season is summer; if it is not summer, an equation other than equation (9) is used.

In the case where plural types of additional information are used, the music selection reference AS (i) based on the additional information is calculated by the following equation (10):

$AS(i)=\Sigma wA(k)*AS(i., k)$ ($k$ is a parameter of additional information)       (10).

In equation (10), wA(k) is a coefficient representing the degree of reflection of each parameter with respect to the music selection reference AS (i).

In the second embodiment, the music selection value ES is calculated by the following equation (11) instead of equation (6):

$ES(i)=w1*(wES1*LS(i)+wES2*TS(i))+w2*AS(i)$       (11).

As shown in equation (11), ES (i) in the second embodiment can be obtained by assigning a weight to each of ES (i) in the first embodiment and the music selection reference AS (i) and adding them together. Specifically, in equation (11), w1 is a coefficient representing the degree of reflection of ES (i) in the first embodiment, and w2 is a coefficient representing the degree of reflection of AS in respect of music selection. At step S15, the music selection processing section 5 calculates a music selection value ES using equation (11).

In the case where the number of reproduction histories is a few, i.e., the case where the number of reproductions is a few, the reproduction history up to now may possibly not be sufficiently reflecting the user's preferences. Under this condition, if a music selection is made using the reproduction history, there is possibility that the user's actual preferences are not properly reflected. Therefore, in the case where the number of reproduction histories is a few, a music selection may be made using AS (i). Alternatively, the coefficient w1 in equation (11) may be set to a small value and the coefficient w2 may be set to a great value. By this, a piece of music which is appropriate for the current situation can be selected, and therefore it is possible to increase the number of reproduction histories while making a music selection which provides a high degree of user's satisfaction.

Third Embodiment

A music selection apparatus according to a third embodiment of the present invention will be described now. The music selection apparatus according to the third embodiment performs a setting process of allowing the user to input their preferences for each area, at a given timing. The third embodiment thereby makes it possible to perform a music selection process which reflects the user's preferences, even in the case where the number of reproductions is a few. Note that the configuration of the music selection apparatus is the same as that shown in FIG. 1. The difference between the first and third embodiments will be mainly described below.

FIG. 14 is a diagram showing exemplary data to be stored in a music database in a third embodiment. In a music database 1 in the third embodiment, an area preference level is set to each piece of music. The area preference level indicates the user's preference level with respect to each area. In the third embodiment, the music selection process is performed using the music selection priority level which includes the area preference level. Pieces of music belonging to the same area have the same value of the area preference level. Note that in the third embodiment, the areas into which an impression space is divided are determined in a fixed manner.

Figure 15:
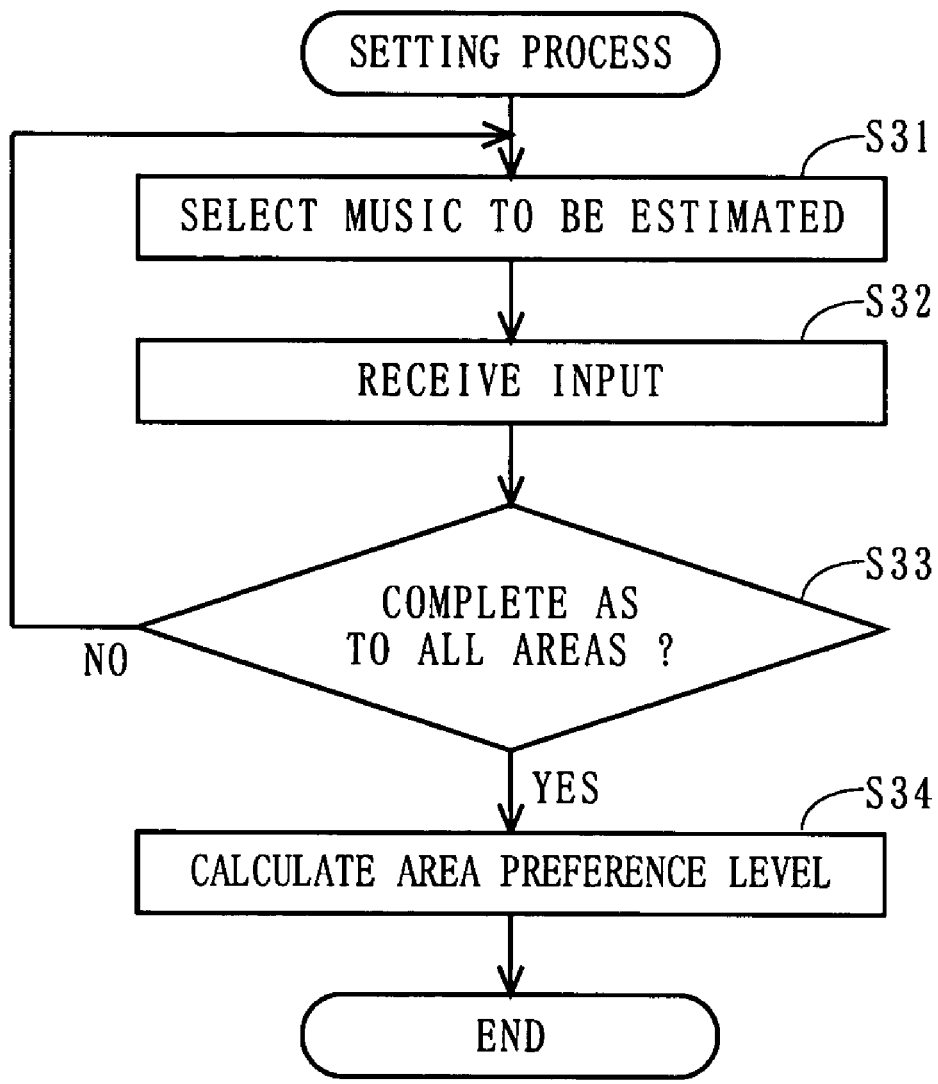
FIG. 15 is a flowchart showing the flow of a setting process in the third embodiment.

FIG. 15 is a flowchart showing the flow of a setting process in the third embodiment. The setting process is performed at a given timing; for example, at the first start of a music selection apparatus or at the time when the user instructs to perform the process. First, at step S31, the music selection processing section 5 selects a piece of music from each area in the impression space. At step S31, in order to calculate the area preference level for many areas, it is desirable to select plural pieces of music, the distance between which in the impression space is greater than a predetermined distance. The music selection processing section 5 selects a piece of music from an area where any piece of music has not yet been selected in the loop of steps S31 to S33.

Figure 16:
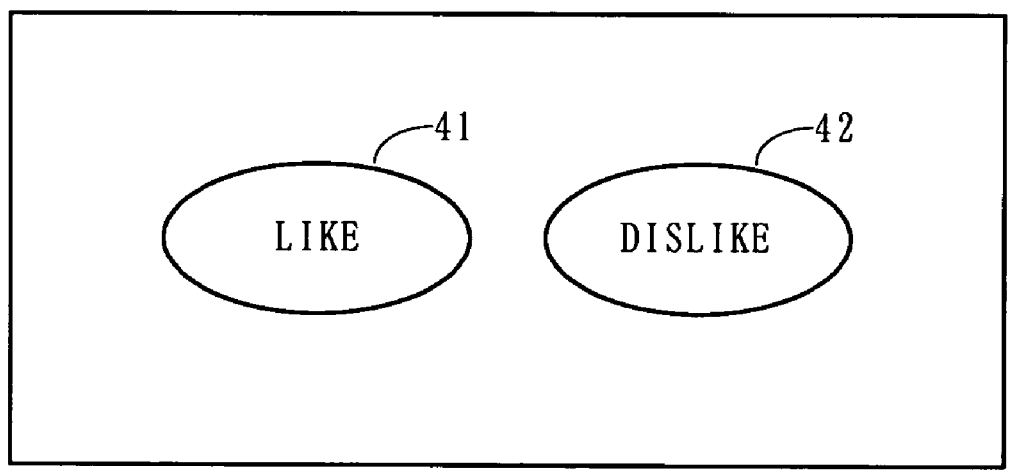
FIG. 16 is a diagram illustrating exemplary buttons provided in an input receiving section 6 and used to make an input at step S31.

At step S32, the music selection processing section 5 receives an input from the user. Specifically, the user inputs an estimation of whether the user likes or dislikes the piece of music selected at step S31. FIG. 16 is a diagram illustrating exemplary buttons provided in the input receiving section 6 and used to make an input at step S31. As shown in FIG. 16, the input receiving section 6 includes a button 41 indicating "like" and a button 42 indicating "dislike". The user makes an estimation of each piece of music by pressing either the button 41 or the button 42. Note that although in the third embodiment the user is allowed to input the estimation of a piece of music using two values, "like" and "dislike", the user may be allowed to input numeric values. At step S32, it is desirable that the control section 4 allow the reproduction section 3 to reproduce a piece of music to be estimated.

At step S33, the music selection processing section 5 determines whether an input has been made to all areas to be estimated. Here, the term "all areas to be estimated" does not necessarily mean all areas present in the impression space. For example, an estimation may be made on only an area in which the number of reproductions of music is a few. If an input has been made to all areas to be estimated, the music selection processing section 5 performs the process of step S34. If an input has not been made to at least one of all areas to be estimated, the music selection processing section 5 performs the process of step S31. Thereafter, the music selection processing section 5 repeats the processes of steps S31 to S33 until an input has been made to all areas to be estimated.

At step S34, the music selection processing section 5 calculates an area preference level. Specifically, the area preference level MEA (i) of an area where the music i belongs is calculated by the following equation (12):

$MEA(i)=1$ (in the case where estimation is "like"); and $MEA(i)=0.1$ (in the case where estimation is "dislike") (12).

In the third embodiment 3, the music selection processing section 5 selects a piece of music using the above-described area preference level. Specifically, the music selection processing section 5 calculates the area selection value EA by the following equation (13) instead of equation (3):

$EA(j)=\Sigma(wEA1*LA(i)+wEA2*TA(i)+wEA3*MEA(i))$ (13)

where wEA3 is a coefficient representing the degree of reflection of the area preference level MBA in respect of area selection. By equation (13), the result of estimation made by the user in the setting process can be reflected to an area selection.

Note that although in the third embodiment, only one piece of music is selected from each area, plural pieces of music may be selected from each area. In this case, the area selection value is calculated by obtaining an average value of the calculated area preference levels of the plural pieces of music.

Fourth Embodiment

Figure 17:
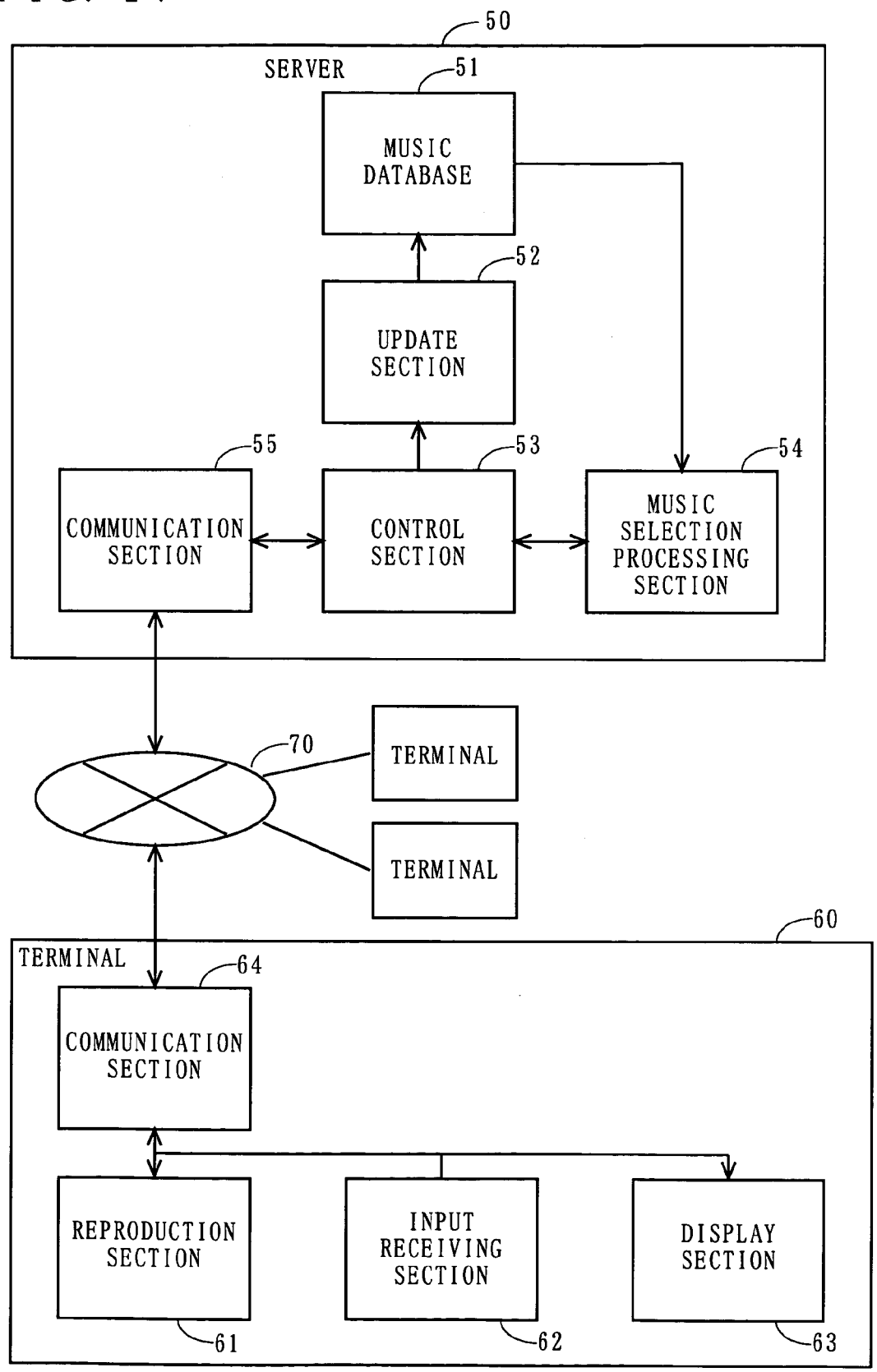
FIG. 17 is a diagram illustrating a music delivery system according to a fourth embodiment of the present invention.

A music delivery system according to a fourth embodiment of the present invention will be described now. FIG. 17 is a diagram illustrating a music delivery system according to the fourth embodiment of the present invention. The music delivery system includes a server 50, a terminal 60, and a network 70. The server 50 which delivers music data and the terminal 60 which receives the delivered music data are connected to the network 70. In addition, a plurality of terminals having the same function as the terminal 60 are connected to the network 70.

In FIG. 17, the server 50 includes a music database 51, an update section 52, a control section 53, a music selection processing section 54, and a communication section 55. Note that the constituents of the server 50 except for the communication section 55 have the same functions as the constituents denoted by the same names in FIG. 1. The communication section 55 transmits/receives data to/from the terminals through the network 70. The terminal 60 includes a reproduction section 61, an input receiving section 62, a display section 63, and a communication section 64. Note that the constituents of the terminal 60 except for the communication section 64 have the same functions as the constituents denoted by the same names in FIG. 1. The communication section 64 transmits/receives data to/from the server 50 through the network 70. As can be seen, the music delivery system shown in FIG. 17 is configured such that the constituents of the music selection apparatus shown in FIG. 1 are divided into two sides, the server side and the terminal side. The operation of the music delivery system is the same as that of the music selection apparatus shown in FIG. 1, except that communication between the server 50 and the terminal 60 is performed through the network 70. By employing the configuration shown in FIG. 17, even if the user's terminal 60 does not have a music database 1, the terminal 60 can download music data from the server 50 and reproduce the music data.

In addition, according to the fourth embodiment, if the user of the terminal 60 instructs an automatic music selection, the server 50 performs an automatic music selection process, whereby a reproduction music list is transmitted to the terminal 60 from the server 50. Further, data on pieces of music included in the reproduction music list is transmitted to the terminal 60 from the server 50. Specifically, the communication section 55 of the server 50 transmits the data on pieces of music to the terminal 60. The communication section 64 of the terminal 60 then receives the data on pieces of music transmitted from the communication section 55 of the server 50. The data on pieces of music having been received is reproduced by the reproduction section 61. Note that data on the pieces of music in the reproduction music list may be transmitted at once or one by one every time reproduction of a piece of music starts (in the case where a skip operation is performed, at the time when the skip operation is performed).

What is claimed is:

1. A music selection apparatus for selecting a piece of music to be reproduced and providing the piece of music to a user, the music selection apparatus comprising:

a music data storage unit operable to store data corresponding to a plurality of pieces of music;

an impression amount storage unit operable to store an impression amount for each of the plurality of pieces of music, the impression amount being obtained by quantifying a listener's impression of each of the plurality of pieces of music;

a music selection priority level storage unit operable to store a music selection priority level for each of the plurality of pieces of music, the music selection priority level indicating at least one of a reproduction history and a preference level of each of the plurality of pieces of music; and a music selection processing unit operable to perform a music selection process of selecting one of the plurality of pieces of music to be reproduced from the plurality of pieces of music using a distance between each of the plurality of pieces of music in an impression space and the music selection priority level, the impression space having coordinate axes composed of components of the impression amount.

2. The music selection apparatus according to claim 1, wherein the music selection processing unit includes:

a region determination unit operable to determine one region from among a plurality of regions into which the impression space is divided, based on the music selection priority level of each of the plurality of pieces of music; and a music selection performing unit operable to perform a music selection process on each of the plurality of pieces of music whose impression amounts belong to the one region, using the music selection priority level.

3. The music selection apparatus according to claim 1, wherein the music selection processing unit includes:

an association level calculation unit operable to calculate an association level for each one of the plurality of pieces of music, the association level of one of the plurality of pieces of music being obtained by changing the music selection priority level of each of others of the plurality of pieces of music based on a positional relationship with the others of the plurality of pieces of music in the impression space; and a music selection unit operable to select one of the plurality of pieces of music to be reproduced with probability based on the music selection priority level and the association level of each of the plurality of pieces of music.

4. The music selection apparatus according to claim 1, wherein the music selection processing unit includes:

a music selection priority level calculation unit operable to calculate the music selection priority level of all positions in the impression space, based on the music selection priority level of each of the plurality of pieces of music;

a reference position determining unit operable to determine a reference position in the impression space with probability based on the music selection priority level calculated by the music selection priority level calculation unit; and a music selection determination unit operable to determine one of the plurality of pieces of music to be reproduced based on a positional relationship between a position of each of the plurality of pieces of music and the reference position in the impression space.

5. The music selection apparatus according to claim 1, further comprising a reproduction unit operable to reproduce the one of the plurality of pieces of music selected by the music selection processing unit, using the data stored in the music data storage unit.

6. The music selection apparatus according to claim 5, further comprising:

a music specification receiving unit operable to receive from the user an input specifying one of the plurality of pieces of music to be reproduced; and a reproduction history update unit operable to update, when the input is received by the music specification receiving unit, the reproduction history stored in the music selection priority level storage unit, in response to the input, wherein the music selection priority level includes at least one of a number of reproductions of the one of the plurality of pieces of music and a date on which a the one of the plurality of pieces of music was last reproduced, as information indicating the reproduction history.

7. The music selection apparatus according to claim 5, further comprising:

a preference level setting receiving unit operable to receive from the user an input for setting a preference level for the one of the plurality of pieces of music reproduced by the reproduction unit; and a preference level update unit operable to update, when the input is received by the preference level setting receiving unit, the preference level stored in the music selection priority level storage unit, in accordance with contents of the input, wherein the preference level includes at least information indicating the preference level.

8. The music selection apparatus according to claim 7, further comprising a test music selection unit operable to select plural pieces of music as pieces of test music, from the plurality of pieces of music stored in the music data storage unit, a distance between the plurality of pieces of music in the impression space being greater than a predetermined distance, wherein the reproduction unit reproduces the pieces of test music in response to the selection of the pieces of test music by the test music selection unit.

9. The music selection apparatus according to claim 5, further comprising:

a stop receiving unit operable to receive from the user an input for stopping reproduction of the one of the plurality of pieces of music performed by the reproduction unit; and a music selection priority level update unit operable to update the music selection priority level stored in the music selection priority level storage unit, in accordance with a proportion of part of the one of the plurality of pieces of music reproduced by the reproduction unit to all pieces of music.

10. A method of selecting music employed in a music selection apparatus for selecting a piece of music to be reproduced and providing the piece of music to a user, the method comprising:

a music data obtaining step of obtaining data corresponding to a plurality of pieces of music;

an impression amount obtaining step of obtaining an impression amount for each of the plurality of pieces of music, the impression amount being obtained by quantifying a listener's impression of each of the plurality of pieces of music;

a music selection priority level obtaining step of obtaining a music selection priority level for each of the plurality of pieces of music, the music selection priority level indicating at least one of a reproduction history and a preference level of each of the plurality of pieces of music; and a music selection processing step of performing a music selection process of selecting one of the plurality of pieces of music to be reproduced from the plurality of pieces of music using a distance between each of the plurality of pieces of music in an impression space and the music selection priority level, the impression space having coordinate axes composed of components of the impression amount.

11. The music selection method according to claim 10, wherein the music selection processing step includes performing a music selection process further comprises:
 a region determination step of determining one region from among the plurality of regions into which the impression space is divided, based on the music selection priority level of each of the plurality of pieces of music; and
 a music selection performing step of performing a music selection process on each of the plurality of pieces of music whose impression amounts belong to the one region determined at the region determination step, using the music selection priority level.

12. The music selection method according to claim 10, wherein the music selection processing step further comprises:
 an association level calculation step of calculating an association level for each one of the plurality of pieces of music, the association level of one of the plurality of pieces of music obtained by changing the music selection priority levels of others of the plurality of pieces of music based on a positional relationship with the others of the plurality of pieces of music in the impression space; and
 a music selection step of selecting one of the plurality of pieces of music to be reproduced with probability based on the music selection priority level and the association level of each of the plurality of pieces of music.

13. The music selection method according to claim 10, wherein the music selection processing step further comprises:
 a music selection priority level calculation step of calculating the music selection priority level of all positions in the impression space, based on the music selection priority level of each of the plurality of pieces of music;
 a reference position determining step of determining a reference position in the impression space with probability based on the music selection priority level; and
 a music selection determination step of determining one of the plurality of pieces of music to be reproduced based on a positional relationship between a position of each of the plurality of pieces of music and the reference position in the impression space.

14. The music selection method according to claim 10, further comprising a reproduction step of reproducing the one of the plurality of pieces of music selected from the music selection process, using the data corresponding to the plurality of pieces of music.

15. The music selection method according to claim 14, further comprising:
 a music specification receiving step of receiving from the user an input specifying one of the plurality of pieces of music to be reproduced; and
 a reproduction history update step of updating the reproduction history in response to the input, wherein
 the music selection priority level includes at least one of a number of reproductions of the one of the plurality of pieces of music and a date on which the one of the plurality of pieces of music was last reproduced, as information indicating the reproduction history.

16. The music selection method according to claim 14, further comprising:
 a preference level setting receiving step of receiving from the user an input for setting a preference level for the one of the plurality of pieces of music; and
 a preference level update step of updating the preference level in accordance with the input, wherein
 the preference level includes at least information indicating the preference level.

17. The music selection method according to claim 16, further comprising a test music selection step of selecting plural pieces of music as pieces of test music from the plurality of pieces of music, a distance between the plural pieces of music in the impression space being greater than a predetermined distance, wherein
 at the reproduction step, the pieces of test music are reproduced in response to the selection of the pieces of test music.

18. The music selection method according to claim 14, further comprising:
 a stop receiving step of receiving from the user an input for stopping reproduction of the one of the plurality of pieces of music; and
 a music selection priority level update step of updating the music selection priority level in accordance with a proportion of part of the one of the plurality of pieces of music to all pieces of music.

19. A program embodied on a computer readable recording medium, the program functioning to:
 select a piece of music to be reproduced;
 provide the piece of music to a user;
 store data corresponding to a plurality of pieces of music in a music data storage unit;
 store an impression amount for each of the plurality of pieces of music in an impression amount storage unit, the impression amount being obtained by quantifying a listener's impression of each of the plurality of pieces of music;
 store a music selection priority level for each of the plurality of pieces of music in a music selection priority level storage unit, the music selection priority level indicating at least one of a reproduction history and a preference level of each of the plurality of pieces of music; and
 perform a music selection process, using a music selection processing unit, of selecting one of the plurality of pieces of music to be reproduced from the plurality of pieces of music using a distance between each of the plurality of pieces of music in an impression space and the music selection priority level, the impression space having coordinate axes composed of components of the impression amount.

20. A music delivery system comprising a server for delivering a piece of music to a terminal, the terminal being capable of providing the piece of music to a user, wherein the server includes:
 a music data storage unit operable to store data corresponding to a plurality of pieces of music;
 an impression amount storage unit operable to store an impression amount for each of the plurality of pieces of music, the impression amount obtained by quantifying a listener's impression of each of the plurality of pieces of music;

a music selection priority level storage unit operable to store a music selection priority level for each of the plurality of pieces of music, the music selection priority level indicating at least one of a reproduction history and a preference level of each of the plurality of pieces of music;

a music selection processing unit operable to perform a music selection process of selecting one of the plurality of pieces of music to be reproduced from the plurality of pieces of music using a distance between the each of the plurality of pieces of music in an impression space and the music selection priority level, the impression space having coordinate axes composed of components of the impression amount; and a transmission unit operable to transmit data on the one of the plurality of pieces of music to the terminal, the terminal includes a reception unit operable to receive data on the one of the plurality of pieces of music and a reproduction unit operable to reproduce the data on the one of the plurality of pieces of music.

* * * * *

UNITED STATES PATENT AND TRADEMARK OFFICE
CERTIFICATE OF CORRECTION

PATENT NO. : 7,268,288 B2  Page 1 of 1
APPLICATION NO. : 10/868013
DATED : September 11, 2007
INVENTOR(S) : Hiroaki Yamane et al.

It is certified that error appears in the above-identified patent and that said Letters Patent is hereby corrected as shown below:

In claim 6, column 22, line 8, "on which a the one of" should be --on which the one of--.

In claim 20, column 25, line 10, "between the each" should be --between each--.

Signed and Sealed this

First Day of April, 2008

JON W. DUDAS
*Director of the United States Patent and Trademark Office*